United States Patent
Serna et al.

(10) Patent No.: US 7,916,725 B2
(45) Date of Patent: Mar. 29, 2011

(54) PACKET FORWARDING TO A CONNECTION-ORIENTED NETWORK

(75) Inventors: Pedro Serna, Santander (ES); Leopoldo Alarcon, Malaga (ES)

(73) Assignee: Spyder Navigations L.L.C., Wilmington, DE (US)

( * ) Notice: Subject to any disclaimer, the term of this patent is extended or adjusted under 35 U.S.C. 154(b) by 259 days.

(21) Appl. No.: 10/524,587

(22) PCT Filed: Aug. 21, 2002

(86) PCT No.: PCT/IB02/03373
§ 371 (c)(1),
(2), (4) Date: Feb. 15, 2005

(87) PCT Pub. No.: WO2004/019555
PCT Pub. Date: Mar. 4, 2004

(65) Prior Publication Data
US 2005/0276265 A1    Dec. 15, 2005

(51) Int. Cl.
*H04B 7/00* (2006.01)
(52) U.S. Cl. ........ 370/390; 370/338; 370/352; 370/392; 455/435.1; 455/432.1
(58) Field of Classification Search .................. 370/428, 370/328–331, 341, 347–349, 352, 437, 395.92, 370/432, 400, 296, 252, 256, 310–313, 390–392, 370/409, 338, 235, 395; 499/902–903, 486.1, 499/496.3; 455/422.1, 445, 525, 432.1, 436, 455/435.1

See application file for complete search history.

(56) References Cited

U.S. PATENT DOCUMENTS

| 6,141,347 | A | 10/2000 | Shaughnessy et al |
| 6,987,764 | B2 * | 1/2006 | Hsu ............................... 370/390 |
| 7,058,413 | B2 * | 6/2006 | Lin et al. .................... 455/456.3 |
| 7,061,880 | B2 * | 6/2006 | Basilier ......................... 370/312 |
| 7,339,928 | B2 * | 3/2008 | Choyi et al. .................. 370/390 |

FOREIGN PATENT DOCUMENTS

| EP | 1 071 296 A1 | 1/2001 |
| EP | 1 093 249 A2 | 4/2001 |
| WO | WO 00/51373 | 8/2000 |
| WO | WO 01/58085 | 8/2001 |

OTHER PUBLICATIONS

Communication for European Patent Application 02 755 540.8, mailed Nov. 25, 2009.
Xylomenos et al, "IP Multicast for Mobile Hosts", IEEE Communications Magazine, IEEE Service Center, vol. 35, No. 1, pp. 54-58, XP000683443.

* cited by examiner

*Primary Examiner* — Pablo N Tran

(57) ABSTRACT

The present invention relates to a method, routing device, and access device for forwarding a data packet with multicast purpose to a connection-oriented network, wherein a predetermined broadcast address is added to the data packet if the address of the data packet to be sent is a network-layer multicast address. Based on the broadcast address, the data packet is forwarded to a plurality of access devices (31-3n) of the connection-oriented network, arranged to check whether the destination address of the data packet is supported. Then, the data packet is forwarded from a supporting access device (32) to the destination address. Thereby, the data packet does not have to be sent to every possible destination address one by one, and link capacity can be saved.

11 Claims, 5 Drawing Sheets

PACKET FORWARDING TO A CONNECTION-ORIENTED NETWORK

FIELD OF THE INVENTION

The present invention relates to a method, routing device and access device for forwarding a data packet, e.g. an Internet Protocol (IP) data packet, to a connection-oriented network, e.g. a cellular network.

BACKGROUND OF THE INVENTION

When data packets are transmitted through networks, both network-layer addresses, e.g. Internet IP addresses, and link-layer addresses are used. The network layer is responsible for routing data packets from one host to another. The network layer routes a data packet through a series of packet switches, called routers in the Internet, between the source and destination. To move a packet from one node, e.g. a host or a packet switch, to the next node in the route, the network layer must rely on the services of the link layer. In particular, at each node, the network-layer protocol passes the data packet to the link-layer, which delivers the data packet to the next node along the route. At this next node, the link-layer passes the data packet to the network layer. The services provided at the link-layer depend on the specific link-layer protocol employed over the link.

Due to the fact that there are both network-layer addresses, for example Internet IP addresses, and link-layer addresses, there is a need to translate between them. For the Internet with IPv4, this is achieved by the address resolution protocol (ARP) as defined in the Internet Engineering Task Force (IETF) specification RFC826. Every Internet host and router has an ARP module. For the Internet with IPv6, this is achieved by the address resolution procedure as defined in the Internet Engineering Task Force (IETF) specification RFC2461.

In connectionless access link networks that support broadcasting at link level, like Wireless Local Area Network (WLAN) or Ethernet, an access router (AR) can send link level frames containing IP data packets in broadcast and every host attached to the link can pick up the frame. The IP packet contained within the frame can itself be addressed to a single host via or multiple ones via an IP multicast address.

In cellular based systems supporting mobile nodes, there is an entity between the AR and the final host, e.g. mobile node. This entity is the access node or base station and is called hereinafter a cellular access point (CAP). The CAP provides link-level connectivity to the mobile node. This cellular access is connection-oriented and the CAP provides all features used to support these connection-oriented principles, e.g. quality of service (QoS) and reservation of resources. By connection-oriented it is meant that before data packets can be exchanged between a mobile node and the CAP, it is necessary to establish an association between both of them via radio signalling. This signalling is used to set up a radio bearer, which provides the radio resources to transmit the data packets. Because of this connection-oriented nature, multicasting a data packet to many mobile nodes requires sending one copy on each radio bearer, e.g. on each association between the CAP and the mobile node.

FIG. 4 shows a schematic diagram indicating an address resolution scheme provided at an AR 20 for converting an incoming IP data packet 60 into a link-layer frame 70 forwarded to the mobile node. At the AR 20, a routing table 80 is provided the entries of which provide a link between the network-layer destination address (DA) of the incoming IP data packet 60 and a respective interface (I) for routing the data packet to the mobile node. Furthermore, the AR 20 provides a neighbour cache 90 for each interface, in which respective link-layer addresses (MN_LLA) are allocated to the supported destination addresses.

When the IP data packet 60 which comprises a header portion 61 and a payload portion 62 arrives at the AR 20, the AR 20 derives the respective routing interface from the routing table 80 and uses the neighbour cache of the derived interface to obtain the corresponding link-layer address ("MN_LLA") of the mobile node. Then, the AR 20 encapsulates the received IP data packet 60 into the payload portion 72 of a link-layer frame 70 having a header portion 71, and adds the derived link-layer address "MN_LLA" of the mobile node to the header portion 71 of the link-layer frame.

In the example shown in FIG. 4, the incoming IP data packet 60 comprises a destination address "A:B:C:D:E:F:G:H", i.e. an IPv6 address, based on which the interface and the link-layer address are obtained at the AR 20. Accordingly, the link-layer address "MN_LLA" is added to the header portion 71 of the link-layer frame 70 and the original network-layer destination address "A:B:C:D:E:F:G:H" is conveyed in the payload portion 72 of the link-layer frame 70, i.e. in the header portion 61 of the encapsulated IP data packet 60. The AR 20 sends the encapsulated IP data packet 60 together with the link-layer frame 70 to the link-layer address "MN_LLA" of the desired mobile node. The link-layer frame 70 then arrives at one or several CAPs allocated to the same AR 20, and the CAPs check the link-layer address "MN_LLA", while only the CAP supporting the addressed mobile node picks up the link-layer frame 70 with the IP data packet 60 and delivers it to the addressed mobile node.

When an IP data packet addressed to the IP address of a mobile node arrives at the AR 20 and the AR 20 does not know the respective link-layer address, this event provokes the address resolution procedure at the network layer which procedure needs to multicast a neighbour solicitation message addressed to a network-layer address for multicast purpose, i.e. a solicited-node multicast address' corresponding to the target IP address. Thus, the IP data packet to be sent is not the incoming IP data packet but the neighbour solicitation message used for learning the link-layer address of the mobile node. At link level, the link-layer frame is addressed to a well know link-layer address for multicast purposes, since the AR 20 is not aware of the link-layer address of the mobile node. This message will reach every mobile node but only those joining this network-layer address for multicast purpose will process the neighbour solicitation message. However due to the connection-oriented nature of the cellular-based system, there is no possibility to broadcast this kind of messages, i.e. messages with multicast purpose in general, to every mobile node. Thus, the IP data packets have to be forwarded to every mobile node one by one over the radio link. This leads to an increased load and wasted bandwidth of the radio link.

SUMMARY OF THE INVENTION

It is therefore an object of the present invention to provide an improved packet forwarding scheme for forwarding a packet to a cellular-based system with multicast feature, by means of which resource utilization can be optimized in the cellular network.

This object is achieved by a method of forwarding a data packet to a connection-oriented network, the method comprising the steps of:

broadcasting the data packet from a routing device to a plurality of access devices of the connection-oriented network using a broadcast address;
checking at each of the plurality of access devices whether a multicast destination address of the data packet is supported; and
forwarding the data packet from a supporting one of the plurality of access devices to the multicast destination address.

Additionally, the above object is achieved by an access device for forwarding a data packet in a connection-oriented network, the access device comprising:
detecting means for detecting a predetermined broadcast address added to the data packet;
checking means for checking whether a multicast destination address of the data packet is supported by the access device; and
forwarding means for forwarding the data packet to the multicast destination address in response to the checking means.

Finally, the above object is achieved by a routing device for forwarding a data packet to a connection-oriented network, the routing device comprising:
checking means for checking whether the data packet requires a multicast transmission; and
addressing means for adding a predetermined broadcast address to the data packet if the checking means determines that the data packet requires a multicast transmission; and
forwarding the data packet from the routing device to a plurality of access devices of a connection-oriented network using the broadcast address.

Accordingly, a multicast transmission can be established between the access router and the access device, even if the destination address cannot be resolved or if the destination address is a network-layer multicast address as such. Then, only the links between the supporting access device and the addressed terminals or nodes are used for transmitting the respective data packet. Thereby, the data packets do not have to be transmitted to every terminal or node one by one over the respective links for multicast purposes, e.g. in the cellular-based system.

The broadcast address may be a predefined address.

The access devices may store mappings between supported destination addresses and their link-layer addresses. The destination address may be a network layer address. In particular, it may be an address of a mobile node. The broadcast address may be a link-layer address.

Furthermore, the data packet may be encapsulated into a link-layer frame comprising said broadcast address. The access devices may discard or drop the data packet if they don't support the multicast destination address.

The connection-oriented network may be a cellular network like UMTS terrestrial radio access network (UTRAN) or GSM/EDGE radio access network (GERAN).

Furthermore, dropping means may be provided at the access device for dropping the data packet if the checking means determines that the destination address is not supported.

The checking means of the routing device may be arranged to check a table by which link-layer addresses are allocated to network-layer addresses.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

The preferred embodiment will now be described in greater detail based on a forwarding scheme for forwarding an IP data packet from an IP-based network to a cellular network, e.g., a third generation mobile communication network connected to the IP-based Network, as long as the cellular network behaves simply as an access link and the IETF address resolution protocols are used on top of the access link.

Figure 1:
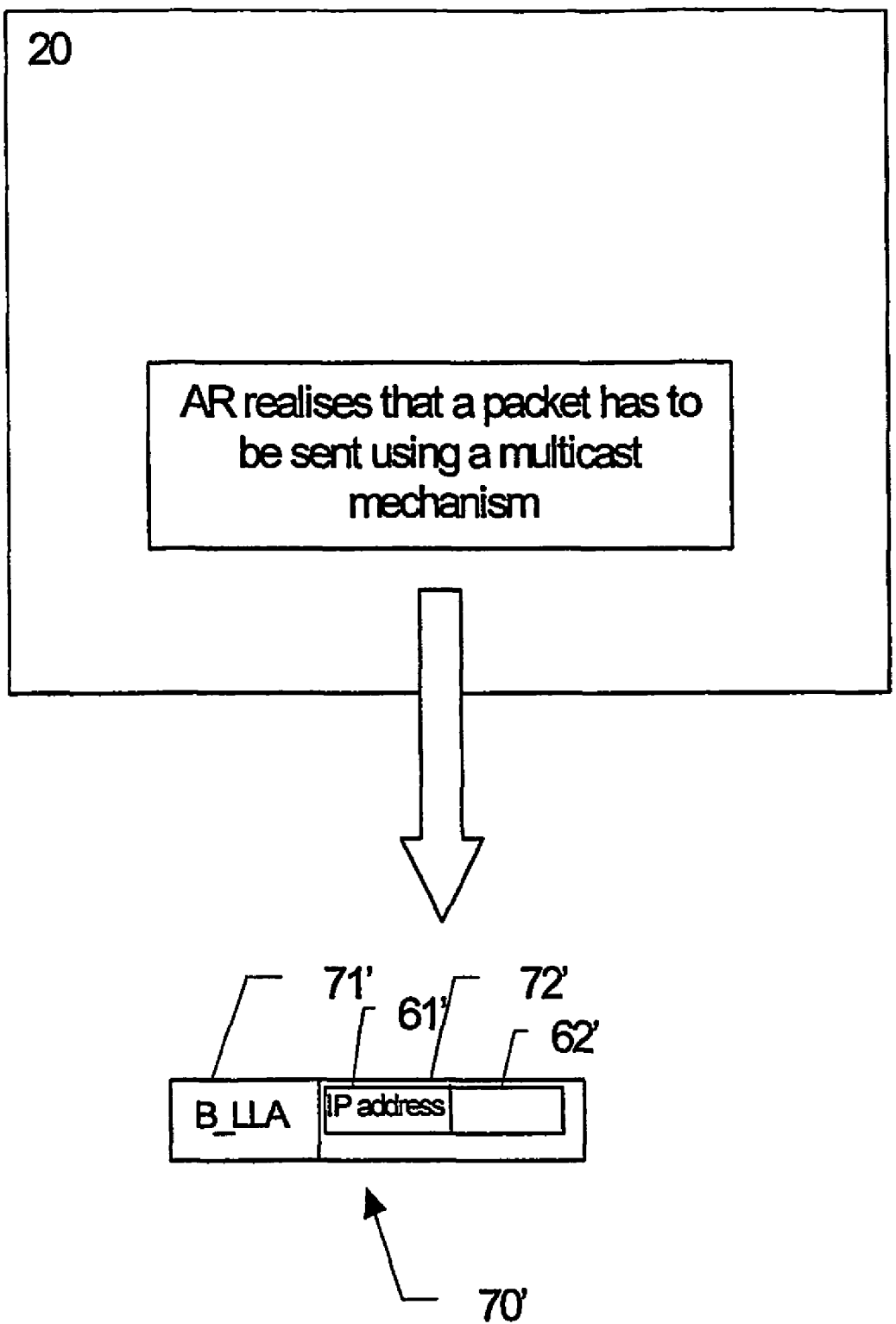
FIG. 1 shows a schematic diagram of the mechanism described in this invention.

FIG. 1 shows a schematic diagram indicating the general mechanism of the present invention. According to this general multicast mechanism, when an access router (AR) 20 determines from a received data packet that it has to send a multicast data packet to a destination node, then the AR 20 broadcasts this multicast data packet to the link layer using a predefined link layer address (B_LLA) for broadcasting purposes. This data packet can be an incoming multicast data packet in case of a normal multicast procedure, or a multicast data packet generated in the AR 20, e.g. a neighbour solicitation message in the address resolution protocol. In the latter case, the incoming data packet at the AR 20 is not a multicast data packet but a unicast one, and the generated multicast data packet is sent to the link layer. In case of the address resolution procedure, the IP packet included in the link layer frame is not the data packet received at the AR 20 but is another one generated in the AR 20 as a result of the address resolution procedure. Thus, the general mechanism can be applied when the AR 20 needs to send a multicast data packet to the link layer e.g. due to an incoming multicast data packet but also when a unicast data packet arrives at the AR 20 and the AR 20 does not know the link layer address associated with the network layer address of the received unicast data packet.

In the following, the case of a received unicast IP data packet is described with reference to FIG. 1. When the AR 20 cannot determine a link-layer address based on the given network-layer address, e.g. IP address, received in a header portion 61' of the received IP data packet with a payload portion 62', it recognizes that a packet has to be sent using the above multicast mechanism according to the present invention. To achieve this, the AR 20 generates a link-layer frame 70' with a broadcast link-layer address in its header portion 71' and the neighbor solicitation message in its payload portion 72'.

Figure 2:
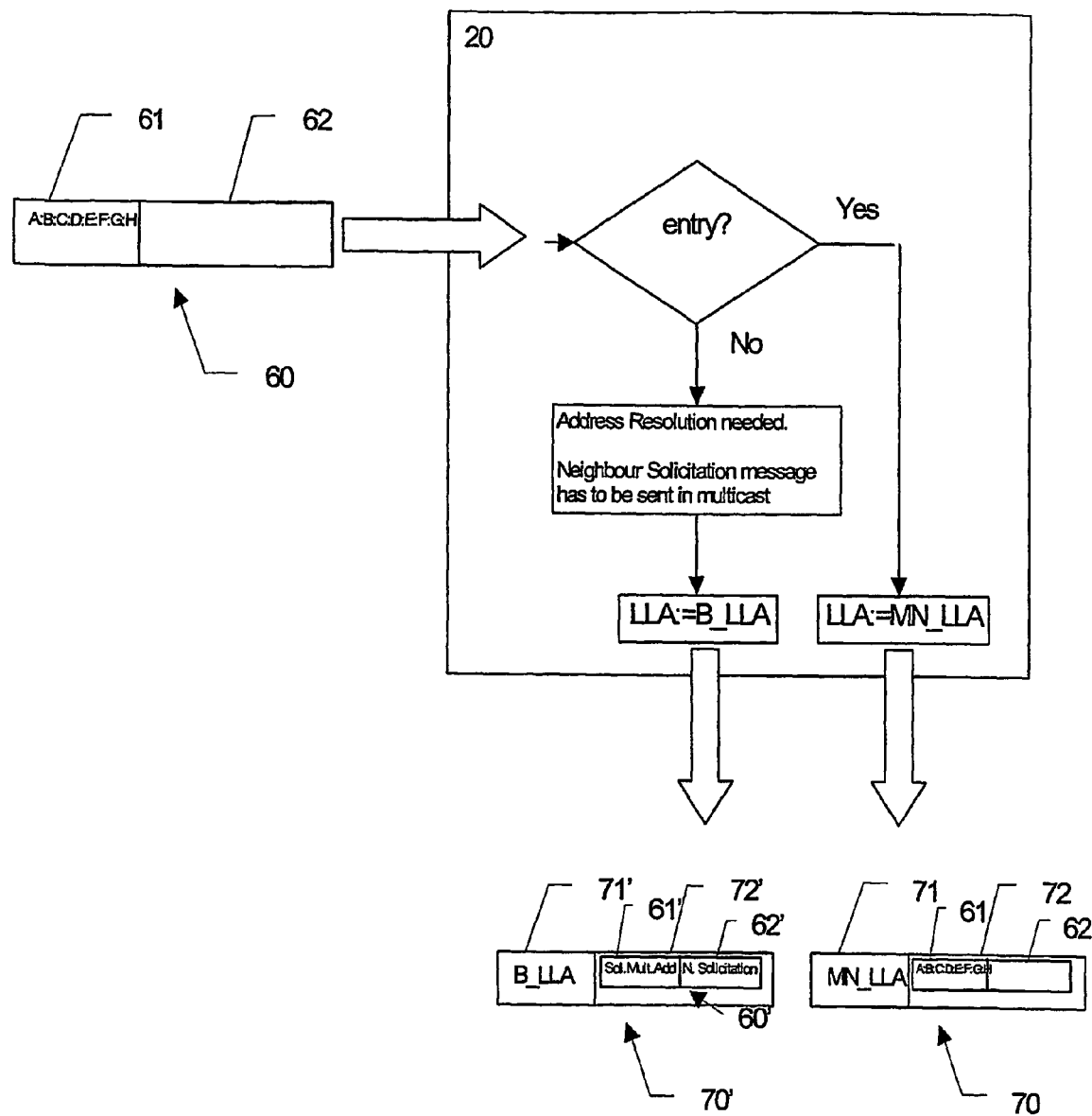
FIG. 2 shows a schematic diagram of a packet forwarding scheme according to the preferred embodiment of the present invention.

FIG. 2 shows a schematic diagram indicating a packet forwarding scheme at the AR 20, according to the preferred embodiment. When the IP data packet 60 with the header portion 61, comprising the destination address "A:B:C:D:E:F:G:H", and the payload portion 62 is received at the AR 20, the routing table 80 and the neighbour cache 90 are checked for any entries regarding this destination address. If such an entry is provided, the corresponding link-layer address "MN_LLA" is added to the header portion 71 of the link-layer frame, while the received IP data packet 60 is added to the payload portion 72 of the link-layer frame 70 and thus encapsulated in the link-layer frame 70.

On the other hand, if no entry is detected, the AR 20 needs to know the link-layer address of the desired mobile node and initiates an address resolution procedure. Then, the AR 20 sends a neighbour solicitation message addressed to the solicited-node multicast address corresponding to the desired mobile node in order to learn the link-layer address of the addressed mobile node from the network. As the neighbour solicitation message has to be sent in multicast, a link-layer broadcast address "B_LLA" is then added to the header portion 71' of the broadcast link-layer frame 70', while the neighbour solicitation message is added as an IP packet 60' to the payload portion 72'. In the preferred embodiment of the invention, the broadcast address "B_LLA" is predefined. The predetermined broadcast address "B_LLA" may be stored at the AR 20.

Every CAP (Cellular Access Point) of the cellular network accepts the broadcast link-layer frame 70' with the predetermined broadcast address "B_LLA" and the encapsulated IP data packet 60' and checks the IP destination address of the desired mobile node. Then, only the CAP supporting the addressed mobile node forwards the broadcast link-layer frame 70' with the encapsulated IP data packet 60' to the addressed mobile node.

Figure 3:
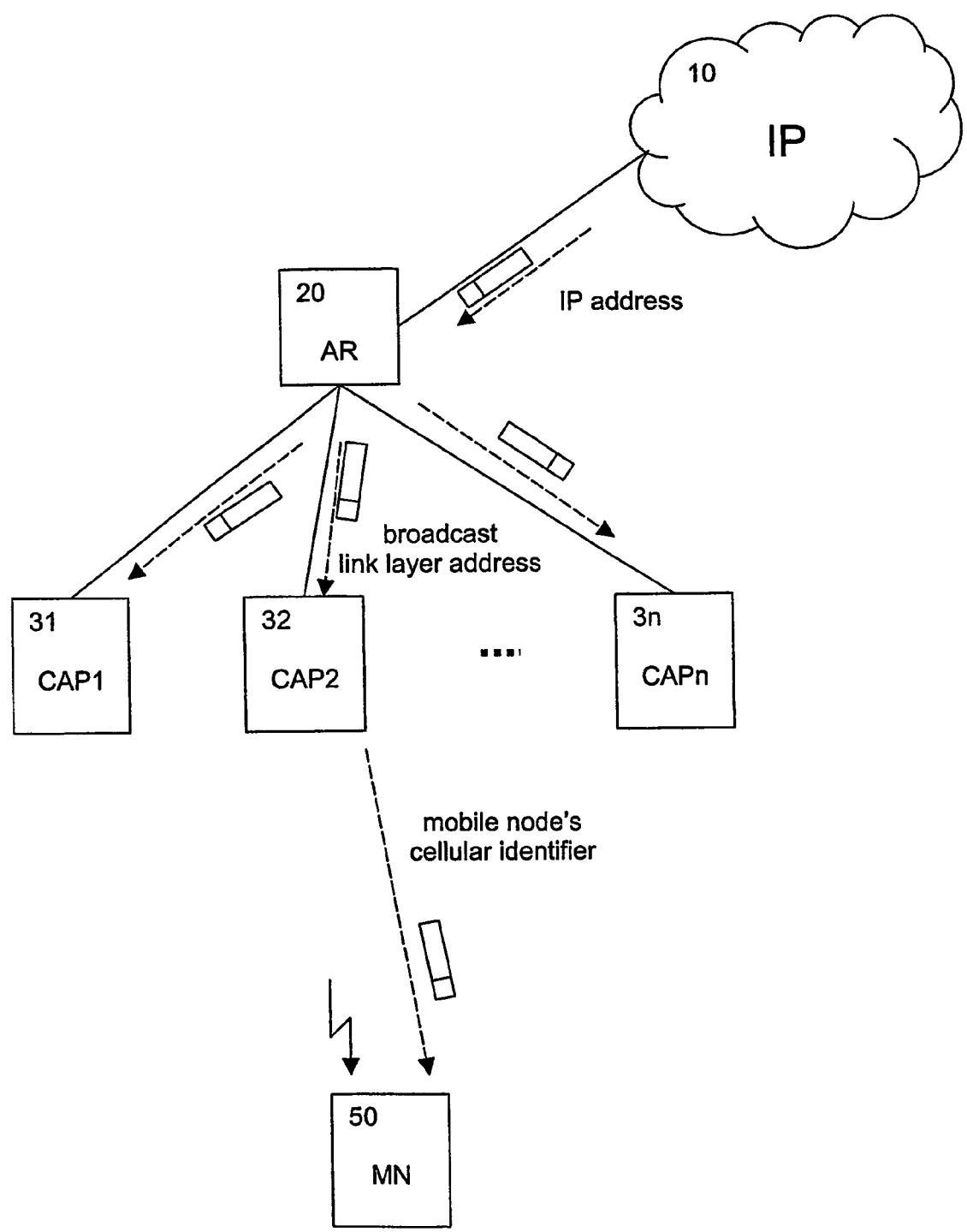
FIG. 3 shows a schematic block diagram of a network environment in which the present invention can be implemented.
Figure 4:
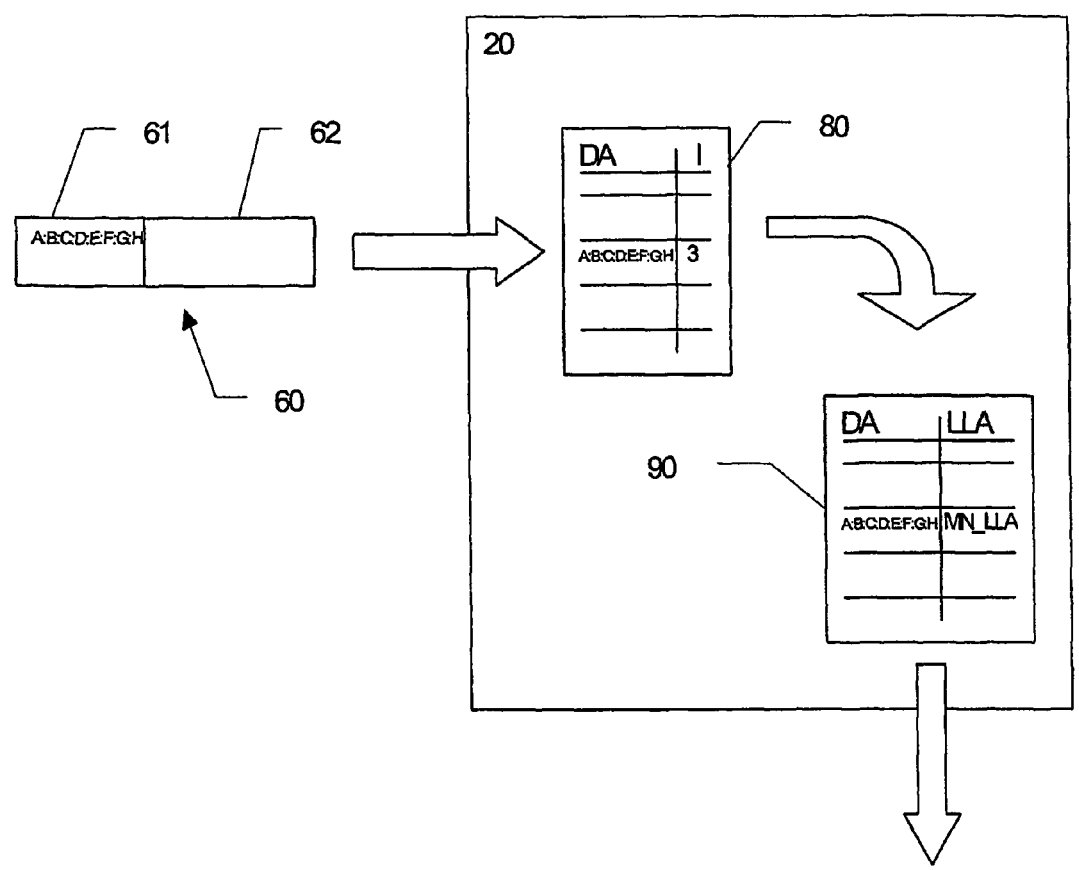
FIG. 4 shows a schematic diagram indicating a known packet forwarding schema.

FIG. 3 shows a schematic block diagram of a network environment in which an IP-based Network 10, e.g. the Internet, is connected via the AR 20 to CAPs 31-3n of a cellular Network. Each of the CAPs provides means by which a radio connection to a mobile node can be established. In the present case, a mobile node 50 to which an IP data packet is to be forwarded is supported by a CAP2 32 via the corresponding radio interface. The radio interface may be based on CDMA (Code Division Multiple Access), WCDMA (Wideband CDMA), GSM (Global System for Mobile communication), WLAN (Wireless Local Area Network), Bluetooth etc. As indicated in FIG. 3, the IP data packet is first transmitted based on a point-to-point transmission to the AR 20 which determines that it has not available and cannot obtain the link-layer address of the addressed mobile node 50. Thus, the AR 20 adds the predetermined broadcast address to the link-layer frame and encapsulates the IP data packet or another message. The link-layer frame with the broadcast link-layer address is then broadcasted to all CAPs 31 to 3n. The CAP2 32 determines based on the IP destination address of the encapsulated IP data packet that it supports the addressed mobile node 50 and forwards the link-layer frame to the addressed mobile node 50. At the remaining CAPs 31 and 33 to 3n, the IP data packet may be discarded or dropped.

Figure 5:
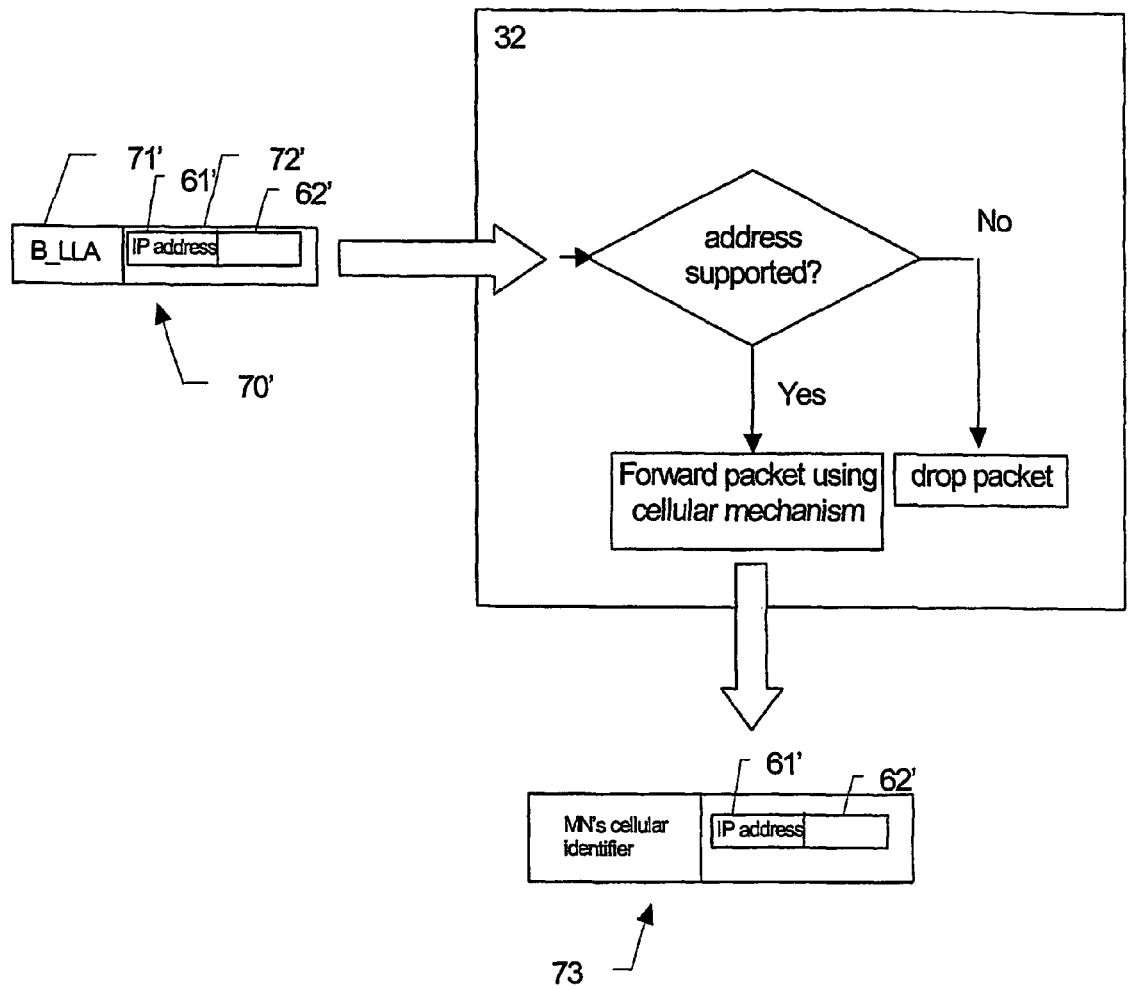
FIG. 5 shows a schematic diagram of an address checking and packet forwarding scheme at an access device according to the preferred embodiment of the present invention.

FIG. 5 shows a schematic diagram of the packet forwarding operation e.g. at the CAP2 32. When the broadcast link-layer frame 70' is received at the CAP2 32, a checking operation is initiated as to whether the IP destination address given in the header portion 61 of the encapsulated IP data packet is supported at the CAP2 32.

If not, the received packet may be discarded or dropped. On the other hand, if the destination address is supported, the IP data packet 60 is forwarded to the desired mobile node 50 using the corresponding mechanism supported by the cellular network, e.g. if UTRAN is used in the cellular network then the IP data packet is encapsulated into a PDCP (Packet Data Conversion Protocol) message 73. Thus, the remaining radio links between the other CAPs 31, 3n do not have to be used in the packet forwarding procedure. Thus, the data packet does not have to be sent to every possible destination address one by one, so that transmission load is reduced and link capacity saved.

It is noted that the present invention is not restricted to any specific IP version and IPv4 or IPv6 may be used. Furthermore, the present invention can be used in any packet forwarding with multicasting scheme for routing any multicast packet to a connection-oriented system. In particular, the present invention is not restricted to the specific network-layer and link-layer addresses and the addressed mobile node mentioned in the preferred embodiment. Thus, the preferred embodiments may vary within the scope of the attached claims.

The invention claimed is:

1. A method of forwarding a data packet, said method comprising:
    receiving the data packet, wherein the data packet includes a unicast destination address corresponding to a mobile node;
    generating a link-layer frame, wherein the link-layer frame includes a broadcast address and the unicast destination address; and
    sending, via the broadcast address, the link-layer frame to a plurality of access devices, wherein at least one access device of the plurality of access devices supports the mobile node, and wherein the broadcast address is configured such that each of the plurality of access devices does not have to join the broadcast address in order to process the link-layer frame.

2. The method according to claim 1, wherein said broadcast address is predefined.

3. The method according to claim 1, further comprising:
    determining that the at least one access device supports the mobile node; and
    forwarding the link-layer frame to the mobile node.

4. The method according to claim 1, wherein said data packet is an IP data packet.

5. The method according to claim 1, wherein said broadcast address is a link-layer address.

6. The method according to claim 1, wherein said plurality of access devices store mappings between supported destination addresses and link-layer addresses corresponding to the supported destination addresses.

7. The method according to claim 1, wherein said unicast destination address is a network layer address.

8. The method according to claim 1, wherein the data packet further comprises a payload, and further wherein the payload is included in the link-layer frame.

9. The method according to claim 1, further comprising encapsulating said data packet into the link-layer frame.

10. The method according to claim 1, wherein said link-layer frame is discarded by an access device from the plurality of access devices if the access device does not support the mobile node.

11. A routing device for forwarding a data packet, said routing device comprising:
    a receiving unit configured to receive the data packet, wherein the data packet includes a unicast destination address corresponding to a mobile node;
    a checking unit configured to determine whether a link-layer address corresponding to the mobile node is available;
    an addressing unit configured to generate a link-layer frame if the link-layer address corresponding to the mobile node is not available, wherein the link-layer frame includes the unicast destination address and a broadcast address; and a forwarding unit configured to forward, via the broadcast address, the link-layer frame to a plurality of access devices, wherein at least one access device of the plurality of access devices supports the mobile node, and wherein the broadcast address is configured such that each of the plurality of access devices does not have to join the broadcast address in order to process the link-layer frame.

* * * * *